Sept. 2, 1924. Re. 15,907

F. J. CLARK

EXPRESSION DEVICE FOR AUTOMATIC PLAYERS

Original Filed Oct. 18, 1919

INVENTOR.
FRANK J. CLARK
BY
Ralph L. Brown
ATTORNEY.

Reissued Sept. 2, 1924. Re. 15,907

UNITED STATES PATENT OFFICE.

FRANK J. CLARK, OF MILWAUKEE, WISCONSIN, ASSIGNOR TO CLARK PNEUMATIC ACTION COMPANY, OF MILWAUKEE, WISCONSIN, A CORPORATION OF WISCONSIN.

EXPRESSION DEVICE FOR AUTOMATIC PLAYERS.

Original No. 1,384,010, dated July 5, 1921, Serial No. 331,589, filed October 18, 1919. Application for reissue filed March 6, 1922. Serial No. 541,584.

*To all whom it may concern:*

Be it known that I, FRANK J. CLARK, a citizen of the United States, residing at Milwaukee, in the county of Milwaukee and State of Wisconsin, have invented a certain new and useful Improvement in Expression Devices for Automatic Players, of which the following is a full, clear, concise, and exact description, reference being had to the accompanying drawings, forming a part of this specification.

This invention relates to expression devices for automatic players.

Two general methods have been adopted for controlling the expression in pneumatic player pianos and the like. In each instance, however, this is accomplished by varying the degree of tension in the player chest so as to effect a corresponding change in the force with which the hammers are driven against the desired strings. By the first method the degree of tension in the player chest is varied by controlling the communication between the player chest and the source of air tension, such as the bellows and associated parts. This obviously requires the maintenance of a maximum tension in the parts connected with the bellows, with the result that the bellows at all times operate under full load. By the second method the degree of tension in the player chest is varied by the admission of more or less atmospheric air thereto. This method has its advantages over the first method in that the load upon the bellows depends upon the degree of tension in the player chest and the load is consequently reduced with any reduction in the degree of vacuum therein. The first method has at the present time, however, generally superseded the second method on account of the sluggish action of the latter due to a heretofore inability to provide a sufficiently sensitive control for the admission of the atmospheric air.

One object of the present invention is the provision of an exceedingly sensitive expression control device well adapted for, though not limited to, use in systems of the latter type.

The tension in a vacuum system of the character referred to is dependent upon the power delivered to the bellows and upon the energy required of the system in producing the music. For instance, assuming that the power delivered to the bellows is constant, the tension of the system ordinarily varies with the number of notes that are being played. This tension must, however, be maintained above a definite allowed minimum degree in order to produce proper action of the player parts.

Another object of the invention is therefore to provide means for accomplishing this purpose by automatically controlling the admission of atmospheric air to the system.

Another object is to provide an exceedingly simple expression device for player pianos and the like.

Other objects and advantages will hereinafter appear.

One embodiment of the invention is illustrated in the accompanying drawings.

Figure 1:
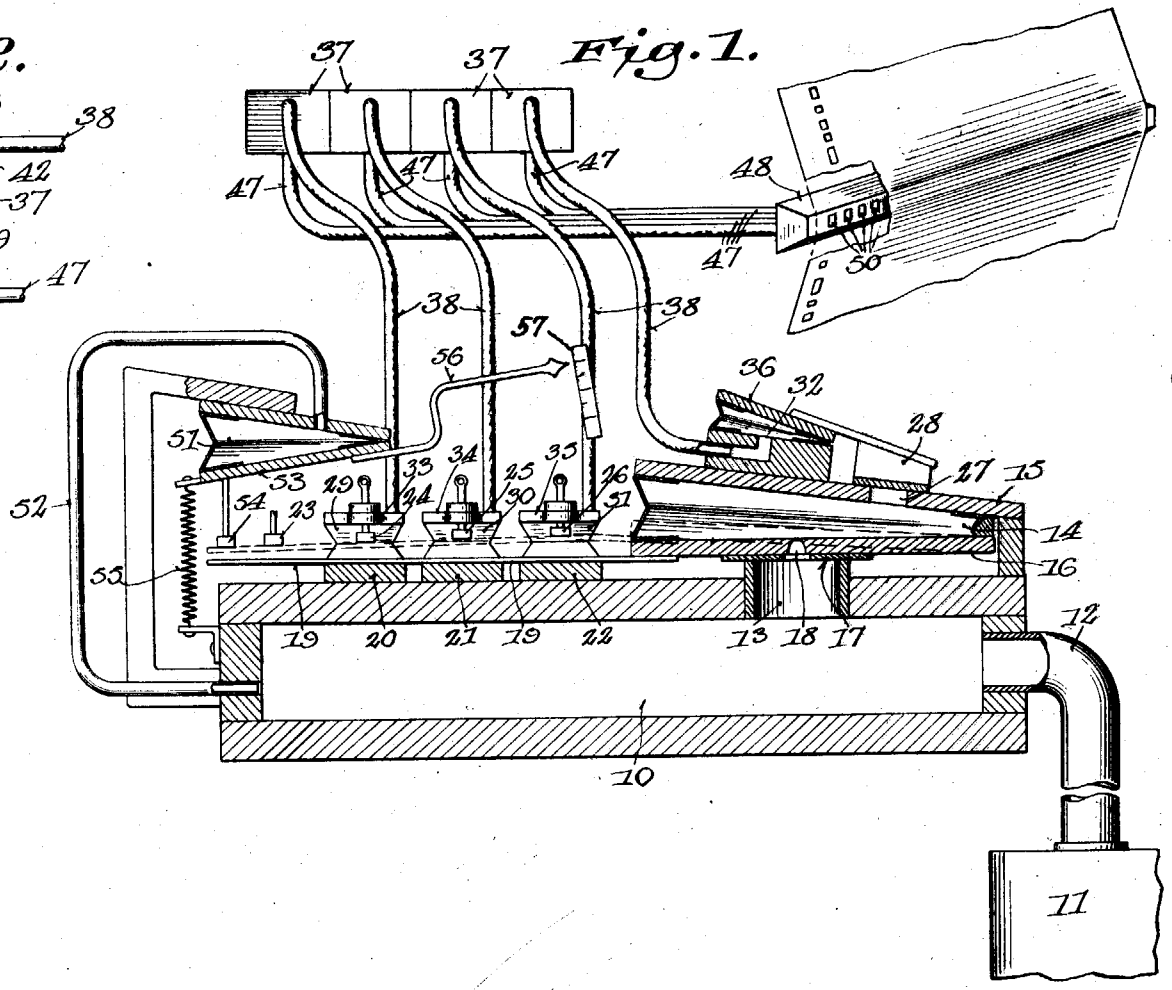
Figure 1 is a longitudinal sectional view through an expression control device, made in accordance with the present invention, and illustrating diagrammatically the manner of connecting the same with a pneumatic system.
Figure 2:
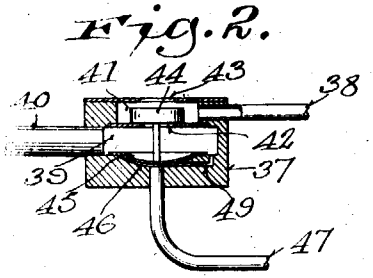
Figure 2 is a sectional view of a certain valve mechanism employed.

The embodiment of the invention shown includes a vacuum chamber 10 communicating preferably with a player chest 11 of any standard or approved construction by means of a pipe 12. The usual bellows (not shown) communicate with the player chest to effect a partial vacuum therein and consequently in the vacuum chamber 10 due to the pipe connection 12.

The vacuum chamber is provided with an air inlet preferably constituting a single opening 13 through which atmospheric air may enter the chamber to reduce the vacuum therein, as well as in the player chest, to any desired degree.

A valve mechanism is employed for controlling the passage of air through said opening. In the present instance, this valve mechanism includes a pneumatic 14 in the form of a bellows having a fixed wall 15 rigidly mounted preferably on the vacuum chamber. The movable wall 16 is interposed between the fixed wall 15 and the opening 13 and carries a valve 17 of any appropriate material, such as leather or felt, for covering the opening 13 when the vacuum system is at rest. A small bleed opening 18 is provided through the valve and movable wall through which the tension of the air in the pneumatic is at all times under the influence of the air tension in the chamber. Thus it will be seen that when a partial vacuum is set up in the player chest 11 and the vacuum chamber 10 by the actuation of the main pump or bellows, a corresponding reduction in air pressure is caused in the pneumatic 14, with the result that the pneumatic 14 tends to collapse and thus lift the valve 17 away from the opening 13 to permit air to enter the chamber. The greater the tension in the chamber 10, the further the valve 17 will be moved from closing position.

Means is provided for limiting or controlling this opening or lifting movement of the valve so that very fine adjustments of the valve movements may be had. For this purpose, the movable wall 16 is provided with an extended arm 19, preferably of resilient material, although a rigid arm might be employed. When the pneumatic system is at rest, this arm assumes the full line position of Figure 1 in which it projects across the several fixed stops 20, 21 and 22. As soon as a partial vacuum is created, however, in the chamber 10, the arm is carried upwardly away from these stops by the movable wall 16 until it engages a fixed stop 23. In this position, sufficient air is admitted through the opening 13 to reduce the tension in the chamber to such a minimum that the softest tones under normal playing conditions are produced. In order to obtain a nicely graduated increase in tone volume, several movable stops 24, 25 and 26 are provided for selective engagement with the arm 19, preferably at various points in the length thereof. Thus when the stop 24 is thrust against the arm 19 the arm is forced slightly away from the fixed stop 23 toward the fixed stop 20 and the movable wall 16 with the valve 17 is consequently brought closer to the opening 13. This effects a reduction in the amount of atmospheric air admitted to the chamber 10 with the result that a slightly greater tension is quickly set up in the chamber and the player chest 11. In the same way, the movable stops 25 or 26 may be thrust against the arm 19 to further limit the movement of the wall 16 and valve 17 from the opening 13.

When the arm 19 is made of a resilient material the arrangement of the movable stops along the length of the arm at different distances from the wall 16 is of importance. Since the deflection caused in the spring is proportional to the effective length thereof the stop 26 nearest the wall 16 has a greater limiting effect on the wall than any of the other movable stops. When a rigid arm is employed, however, the same effect is produced by limiting the throw of each of the movable stops.

The loudest tones are produced by moving the valve 17 against the opening 13. This may be accomplished by providing an inlet opening 27 in the pneumatic 14 to completely destroy the vacuum therein. This opening is normally covered by a suitable valve 28 movable toward or from the opening. When valve 28 is moved to open position the vacuum in the pneumatic 14 is destroyed with the result that the pneumatic is expanded and the valve 17 is forced against the opening 13.

Various means may be provided for actuating the various movable stops 24, 25 and 26 or the movable valve 28. Such means may be under the control of the operator or under the control of the music sheet. In the present instance, however, this means includes a plurality of pneumatics 29, 30, 31 and 32 controlled by the music sheet by mechanism to be later explained. The stops 24, 25 and 26 are preferably adjustably mounted upon the movable walls 33, 34 and 35 of the pneumatics 29, 30 and 31, respectively, while the movable valve 28 is carried by the movable wall 36 of the pneumatic 32. Each of these pneumatics may comprise a small bellows of any standard or approved construction which, when in normal expanded condition, retain the parts in the respective positions shown in the drawings. By exhausting the air from any of the pneumatics 29, 30 or 31 the corresponding stop is actuated to engage the arm 19, and by exhausting the air from the pneumatic 32, the valve 28 is lifted to open position.

Each of these pneumatics is connected to a valve mechanism 37, which will now be described, by means of a pipe 38. This mechanism includes a body portion having a central chamber 39 therein which is in constant communication with the vacuum system through a pipe 40. The pipe 38 communicates with a small chamber 41 which may be placed in communication with the chamber 39 through a valve port 42. The chamber 41 is provided with a second valve port 43 normally open to atmospheric pressure so that atmosphere is normally admitted to the corresponding pneumatic through the pipe 38. A single valve 44 is adapted to cover either of the ports 42 or 43. This valve is controlled by a diaphragm 45 suspended across a small chamber 46 which is connected by a pipe 47 with the usual tracker board 48 over which the sheet music passes. A partial vacuum is normally maintained in the pipe 47 and chamber 46 by means of the small bleed opening 49 communicating with the exhaust chamber 39.

Each pipe 47 communicates with a suitable opening 50 in the tracker board 48 over which an opening or line of openings in the music sheet may pass. When this occurs air is admitted to the pipe 47 and the diaphragm chamber 46 to lift the diaphragm 45 and move the valve 44 to open the port 42 and close the port 43. This places the pipe 38 in communication with the exhaust pipe 40 to withdraw the air from the selected pneumatic 29, 30, 31 or 32. This effects the collapse of the selected pneumatic and the consequent actuation of the desired stop 24, 25 or 26 or the valve 28 to produce the desired increase in tone volume in the manner above pointed out. After the opening or openings in the music sheet have passed over the perforation in the tracker board atmospheric air is cut off from the pipe 47 and the valve mechanism, as well as the collapsed pneumatic, return to their normal condition.

The mechanism for maintaining a minimum working tension in the pneumatic system will now be described. This mechanism may assume various forms but in the present instance includes a pneumatic 51 preferably mounted upon and communicating with the vacuum chamber 10 through a pipe 52, so that the air tension in the pneumatic corresponds with the tension in the pneumatic system. The movable wall 53 of the pneumatic carries a stop 54 for engaging the arm 19 under certain conditions. A spring 55 yieldably maintains the pneumatic in an expanded condition when the system is at rest with the stop in the position shown in the drawings. As soon as a partial vacuum is established in the vacuum chamber the pneumatic tends to collapse and thus withdraws the stop 54 away from the arm. The tension of the spring 55 is such that when the tension in the system approaches an operative minimum, the stop 54 is advanced into engagement with the arm 19 to effect a movement of the valve 17 toward the opening 13. The amount of atmospheric air admitted to the chamber 10 is thus reduced and the proper working tension accordingly maintained.

In order to guide one in effecting or correcting the adjustments of the system, a pointer such as shown at 56 may be mounted upon the movable wall 53 of the pneumatic 51. This pointer cooperating with a suitable fixed scale 57 will indicate at all times the true tension in the system.

Various changes may be made in the embodiment of the invention hereinabove specifically described without departing from or sacrificing any of the advantages of the invention defined in the following claims.

I claim:

1. An expression device for pneumatic players including a vacuum system having an air inlet, a valve mechanism for controlling the admission of air through said inlet and influenced by the tension in said system toward open position, and stops for selectively limiting the opening movement of said valve mechanism to any desired degree to vary the tension in said system.

2. An expression device for pneumatic players including a vacuum system having an air inlet, an outwardly opening valve cooperating with said inlet to control the admission of atmospheric air to said system, means actuated by the air tension in said system for effecting an opening movement between said valve and inlet, and means for selectively limiting said opening movement to any desired degree to vary the tension in said system.

3. An expression device for pneumatic players including a vacuum system having an air inlet, a valve mechanism for controlling the admission of air to said system, a pneumatic influenced by the tension in said system for actuating said valve mechanism toward open position, and means for selectively limiting the opening movement of said valve to any desired degree to vary the tension in said system.

4. An expression device for pneumatic players including a vacuum system having an air inlet, a valve cooperating with said inlet to control the admission of atmospheric air to said system, a pneumatic actuated by the air tension in said system for moving said valve toward open position, and means for selectively limiting said opening movement to any desired degree to vary the tension in said system.

5. An expression device for pneumatic players including a vacuum system having an air inlet, a valve cooperating with said inlet to control the admission of atmospheric air to said system, a bellows communicating with the air tension in said system for effecting an opening movement between said valve and said inlet, and means for varying the air tension in said bellows to control the opening movement between said valve and inlet.

6. An expression device for pneumatic players including a vacuum system having an air inlet, a valve cooperating with said inlet to control the admission of atmospheric air to said system, a pneumatic for effecting an opening movement between said valve and said inlet, means for selectively limiting the opening movement of said valve to any desired degree, and means for varying the air tension in said pneumatic to control the opening movement of said valve and inlet.

7. An expression device for pneumatic players including a vacuum system having an air inlet, a valve cooperating with said inlet to control the admission of atmospheric air to said system, a pneumatic in continuous but variable communication with the tension of air in said system for effecting an opening movement between said valve and said inlet, and means for controlling the air tension in said pneumatic to control such opening movement.

8. In a device of the character described the combination of a vacuum chamber having an air inlet, a valve mechanism for controlling the admission of air through said inlet and influenced by the tension in said chamber towards open position, stops for selectively limiting the opening movement of said valve mechanism to any desired degree to vary the tension in said chamber, and additional means for controlling the operation of said valve mechanism.

9. In a device of the character described the combination of a vacuum chamber having an air inlet, an outwardly opening valve mechanism for controlling the admission of air through said inlet and influenced by the tension in said chamber toward open position, and means for limiting the opening movement of said valve mechanism to any desired degree to vary the tension in said chamber at will.

10. In a device of the character described the combination of a vacuum chamber having an air inlet, an outwardly opening valve cooperating with said inlet to control the admission of atmospheric air to said chamber, means actuated by the air tension in said chamber for effecting an opening movement between said valve and inlet, and means for limiting such movement to any desired degree to vary the tension in said chamber at will.

11. In a device of the character described the combination of a vacuum chamber having an air inlet, an outwardly opening valve cooperating with said inlet to control the admission of atmospheric air to said chamber, means actuated by the air tension in said chamber for effecting an opening movement between said valve and inlet, and means for controlling the operation of said valve operating means.

12. In a device of the character described the combination of a vacuum chamber having an air inlet, a valve cooperating with said inlet to control the admission of atmospheric air to said chamber, a pneumatic connected with said valve and actuated by the air tension in said chamber for effecting an opening movement between said valve and said inlet, and means for limiting the opening movement of said valve to any desired degree.

13. In a device of the character described the combination of a vacuum chamber having an air inlet, a pneumatic, a valve actuated by said pneumatic for cooperation with said inlet, a bleed duct through said valve and communicating with said pneumatic, an arm carried by said pneumatic and movable with said valve, and means for limiting the movement of said arm.

14. In a device of the character described the combination of a vacuum chamber having an air inlet, a pneumatic, a valve actuated by said pneumatic for cooperation with said inlet, a bleed duct through said valve and communicating with said pneumatic, and means for controlling the air tension in said pneumatic.

15. In a device of the character described the combination of a vacuum chamber having an air inlet, a pneumatic, a valve actuated by said pneumatic for cooperation with said inlet, a bleed duct through said valve and communicating with said pneumatic, an arm carried by said pneumatic and movable with said valve, means for limiting the movement of said arm, and a valve for controlling the tension of air in said pneumatic.

16. In a device of the character described the combination of a vacuum chamber, a valve mechanism actuated by the air tension in said chamber for admitting atmospheric air to said chamber, at least one stop for limiting the opening movement of said valve mechanism, and a pneumatic for moving said stop.

17. In a device of the character described the combination of a vacuum system, valve mechanism for admitting atmospheric air to said system to vary the tension in said system, and pneumatic means controlled by the air tension in said system below a certain degree for limiting the opening of said valve mechanism.

18. In a device of the character described the combination of a vacuum system having an air inlet, valve mechanism actuated by the air tension in said system to admit atmospheric air to said system, means for limiting the opening movement of said valve mechanism to any desired degree, and additional pneumatic means controlled by the air tension in said system for controlling said valve mechanism.

19. In a device of the character described the combination of a vacuum system having an air inlet, valve mechanism actuated by the air tension in said system to admit atmospheric air to said system, means for limiting the opening movement of said valve mechanism to any desired degree, additional means controlled by the air tension in said system for controlling said valve mechanism, and indicating means actuated by said last named means for indicating the degree of air tension in said system.

20. In a device of the character described the combination of a vacuum system having an air inlet, a valve for controlling the admission of air through said inlet, a pneumatic in constant communication with said system and influenced by the air tension therein to actuate said valve toward open position, and means for controlling the opening movement of said valve to any desired degree.

21. In a device of the character described the combination of a vacuum system having an air inlet, a valve for controlling the admission of air through said inlet, a pneumatic in continuous but variable communication with said system and influenced by the air tension therein to actuate said valve toward open position, and means for controlling the opening movement of said valve.

22. In a device of the character described the combination of a vacuum system having an air inlet, a valve for controlling the admission of air through said inlet, a pneumatic for actuating said valve and having a bleed opening through which a variable communication is established with the air tension in said system, and means for controlling the movement of said valve.

23. In a device of the character described the combination of a vacuum chamber having an air inlet, a valve for controlling the admission of air through said inlet, a pneumatic in constant communication with said chamber for actuating said valve toward open position, and an adjustable stop for limiting the opening movement of said valve.

24. In a device of the character described the combination of a vacuum chamber having an air inlet, a pneumatic arranged adjacent said inlet and having means for controlling the admission of air through said inlet, a communication between said pneumatic and chamber to actuate said pneumatic by the air tension in said chamber, and means for controlling said pneumatic to control the admission of air through said inlet.

25. In a device of the character described the combination of a vacuum system, valve mechanism operable to admit atmospheric air to said system to vary the tension in said system, means for controlling the opening of said valve to any desired degree to obtain the desired air tension in said system, and pneumatic means controlled by the air tension in said system for limiting the opening of said valve mechanism to maintain the air tension in said system above a predetermined minimum.

26. An expression device for pneumatic players including a vacuum chamber having an atmospheric air inlet, a single pneumatic having means cooperating with said inlet to control the admission of atmospheric air to said chamber, a communication between said pneumatic and chamber, whereby said pneumatic is actuated in one direction by the air tension in said chamber, and means for admitting atmospheric air to said pneumatic to actuate said pneumatic in another direction.

27. An expression device for pneumatic players including a vacuum chamber having an atmospheric air inlet, a single valve cooperating with said inlet to control the admission of atmospheric air to said chamber, a pneumatic influenced by the air tension in said chamber to move said valve toward open position, and means for admitting atmospheric air to said pneumatic to effect a movement of said valve toward closed position.

28. In a device of the character described, the combination of a vacuum chamber having an atmospheric inlet, and means for controlling the admission of air through said inlet comprising a pneumatic having a chamber influenced by the air tension in said first named chamber, a valve associated with said pneumatic and inlet and influenced by the air tension in said first named chamber to vary the admission of air through said inlet with changes of air tension in said first named chamber, and means for modifying the air tension in said last named chamber to modify the action of said valve.

29. In a device of the character described, the combination of a chamber having an atmospheric inlet, a pneumatic having a chamber communicating with said first named chamber, a valve associated with said pneumatic and inlet and influenced by the air tension in said first named chamber to vary the admission of air through said inlet with changes of air tension in said first named chamber, and means for modifying the air tension in said last named chamber to modify the action of said valve.

30. The combination with a vacuum chamber having a port and a valve cooperating therewith to control the flow of air therethrough, of a pneumatic for controlling the relative positions of said valve and port, said pneumatic having a chamber and communicating passage through which a partial vacuum is induced in said pneumatic chamber from said vacuum chamber and by which said pneumatic is rendered operative to maintain the degree of vacuum in said vacuum chamber substantially constant, said passage being restricted so that the air tension in said pneumatic chamber may be varied relative to that in said vacuum chamber, and means for admitting atmospheric air to said pneumatic chamber to thereby counteract the effect of said passage upon the vacuum in said pneumatic chamber to vary the action of said pneumatic and consequently modify the degree of vacuum in said vacuum chamber.

31. The combination with a vacuum chamber having a port and a valve cooperating therewith to control the flow of air therethrough, of a pneumatic for controlling the relative positions of said valve and port, said pneumatic having a chamber and communicating passage through which the air in said pneumatic chamber is influenced at all times by the vacuum in said vacuum chamber and by which said pneumatic is normally operative to maintain the degree of vacuum in said pneumatic chamber substantially constant, and sheet controlled means for admitting atmospheric air to said pneumatic chamber to counteract the effect of said passage upon the air in said pneumatic chamber to thereby modify the action of said pneumatic and consequently modify the degree of vacuum in said vacuum chamber.

32. An expression device for pneumatic players, comprising a chamber having a port, a pneumatic having a chamber communicating with said first named chamber, a valve associated with said pneumatic and cooperating with said port to control the flow of air therethrough, said valve being arranged to move contra to such flow of air to increase the flow, and means for modifying the air tension in said last named chamber to vary the action of said valve.

33. An expression device for pneumatic players, comprising a pneumatic system having a port, a pneumatic influenced by the air tension in said system and having a movable wall cooperating with said port for controlling the flow of air therethrough, said wall being movable in a direction contra to such flow to increase the flow, and means for modifying the air tension in said pneumatic to modify the action of said movable wall.

34. An expression device for pneumatic players, comprising a pneumatic system having a port, a pneumatic influenced by the air tension in said system and having a movable wall cooperating with said port for controlling the flow of air therethrough, said wall being arranged to move in a direction contra to such flow to increase the flow, and means for controlling the action of said movable wall.

35. An expression device for pneumatic players including a vacuum system having an air passage, a valve mechanism actuated by the air tension in said system for controlling the flow of air through said passage, a resilient arm movable with said valve mechanism, and a plurality of stops selectively operable upon said arm to resist the movement of said valve mechanism.

36. An expression device for pneumatic players including a vacuum system having an air passage, a valve mechanism actuated by the air tension in said system for controlling the flow of air through said passage, resilient means movable with said valve mechanism, and a plurality of stops selectively operable upon said resilient means to resist the movement of said valve mechanism.

37. An expression device for pneumatic players including a vacuum system having an air passage, a valve for controlling the flow of air through said passage, a pneumatic actuated by the air tension in said system for moving said valve in a direction contra to the flow of air through said passage, a spring movable with said valve, and an adjustable stop for resisting the movement of said spring.

38. In an expression device for pneumatic players the combination of a vacuum chamber having an air passage, a valve cooperating with said passage for controlling the flow of air therethrough, a single pneumatic for determining the position of said valve, said pneumatic being influenced by the air tension in said chamber to move said valve contra to the flow of air through said passage as the air tension in said chamber increases, and means for modifying the action of said pneumatic to modify the position of said valve and consequently the air tension in said chamber.

39. The combination with a vacuum chamber of means including a pneumatic for varying and controlling the degree of vacuum in said chamber, a restricted passage constantly open to said chamber and pneumatic through which a partial vacuum is normally induced in said pneumatic and by which said pneumatic is rendered operative to maintain the degree of vacuum in said chamber substantially constant, and means for varying the effect of the vacuum in said chamber upon the vacuum in said pneumatic to modify the action of said pneumatic and consequently the degree of vacuum in said chamber.

40. The combination with a vacuum chamber of means including a pneumatic for varying and controlling the degree of vacuum in said chamber, a restricted passage open to said chamber through which a partial vacuum variable with respect to that in said chamber is induced in said pneumatic and by which said pneumatic is rendered operative to maintain the degree of vacuum in said chamber substantially constant, and separate sheet controlled means for varying the degree of vacuum in said pneumatic to modify the action thereof and thereby vary the degree of vacuum in said chamber.

41. A device for varying and controlling the vacuum in the player chest of a pneumatic player, said device including a pneumatic, a restricted opening in communication with said pneumatic through which a partial vacuum is induced in said pneumatic and by which said pneumatic is rendered responsive to fluctuations in the vacuum in the chest to maintain such vacuum substantially constant, and sheet controlled means including a passage for admitting atmospheric air to said pneumatic to counteract the effect of said restricted opening upon the vacuum therein.

42. A device for varying and controlling the vacuum in a player chest of a pneumatic player, said device including a pneumatic, a restricted opening in constant communication with said pneumatic through which a partial vacuum is induced in said pneumatic and by which said pneumatic is rendered responsive to fluctuations in the vacuum in the chest to maintain such vacuum substantially constant, a second opening for admitting atmospheric air to said pneumatic, and sheet controlled means for controlling the admission of air through said last named opening to vary the action of said pneumatic and consequently the vacuum in said chest.

43. In a device for varying and controlling the air tension in a vacuum chamber, the combination of means including a pneumatic normally operative to maintain the air tension in the chamber substantially constant, said pneumatic having a chamber and a passage communicating therewith through which a partial vacuum is normally induced in said pneumatic chamber from the vacuum chamber, said passage being sufficiently restricted to permit variations in air tension in said pneumatic chamber relative to that in the vacuum chamber, and means for varying the air tension in said pneumatic chamber without varying the operating capacity of said passage to thereby modify the action of said pneumatic and consequently the air tension in the vacuum chamber.

In witness whereof, I hereunto subscribe my name this 6th day of February, 1922.

FRANK J. CLARK.